United States Patent [19]
Lipona

[11] 3,831,389
[45] Aug. 27, 1974

[54] COOLING FOOD PRODUCTS

[76] Inventor: Samuel P. Lipona, P.O. Box 1064, Delano, Calif. 93215

[22] Filed: Dec. 1, 1971

[21] Appl. No.: 203,698

Related U.S. Application Data

[63] Continuation-in-part of Ser. No. 190,373, Oct. 18, 1971, and a continuation-in-part of Ser. No. 188,857, Oct. 13, 1971, Pat. No. 3,793,937.

[52] U.S. Cl. .................................. 62/63, 426/524
[51] Int. Cl. ........................................... F25d 13/06
[58] Field of Search ......... 62/63, 380, 374; 426/524

[56] References Cited
UNITED STATES PATENTS

| | | |
|---|---|---|
| 2,019,551 | 11/1935 | Yarney ............................... 62/380 |
| 3,250,630 | 5/1966 | Webster et al. ........................ 62/63 |
| 3,413,818 | 12/1968 | Pelmulder ......................... 62/374 X |
| 3,479,833 | 11/1969 | Waldin ................................... 62/63 |
| 3,635,045 | 1/1972 | Astrom ............................ 62/374 X |
| 3,733,839 | 5/1973 | Waldin ................................... 62/64 |

Primary Examiner—Meyer Perlin
Assistant Examiner—Ronald C. Capossela

[57] ABSTRACT

Food products, e.g., freshly killed poultry, meat products, freshly harvested vegetables, etc., are cooled by passing through or dipping in a refrigerant liquid such as a low boiling fluorocarbon. Preferably the apparatus has an inlet liquid seal and an outlet liquid seal to prevent escape of fluorocarbon vapor.

6 Claims, 3 Drawing Figures

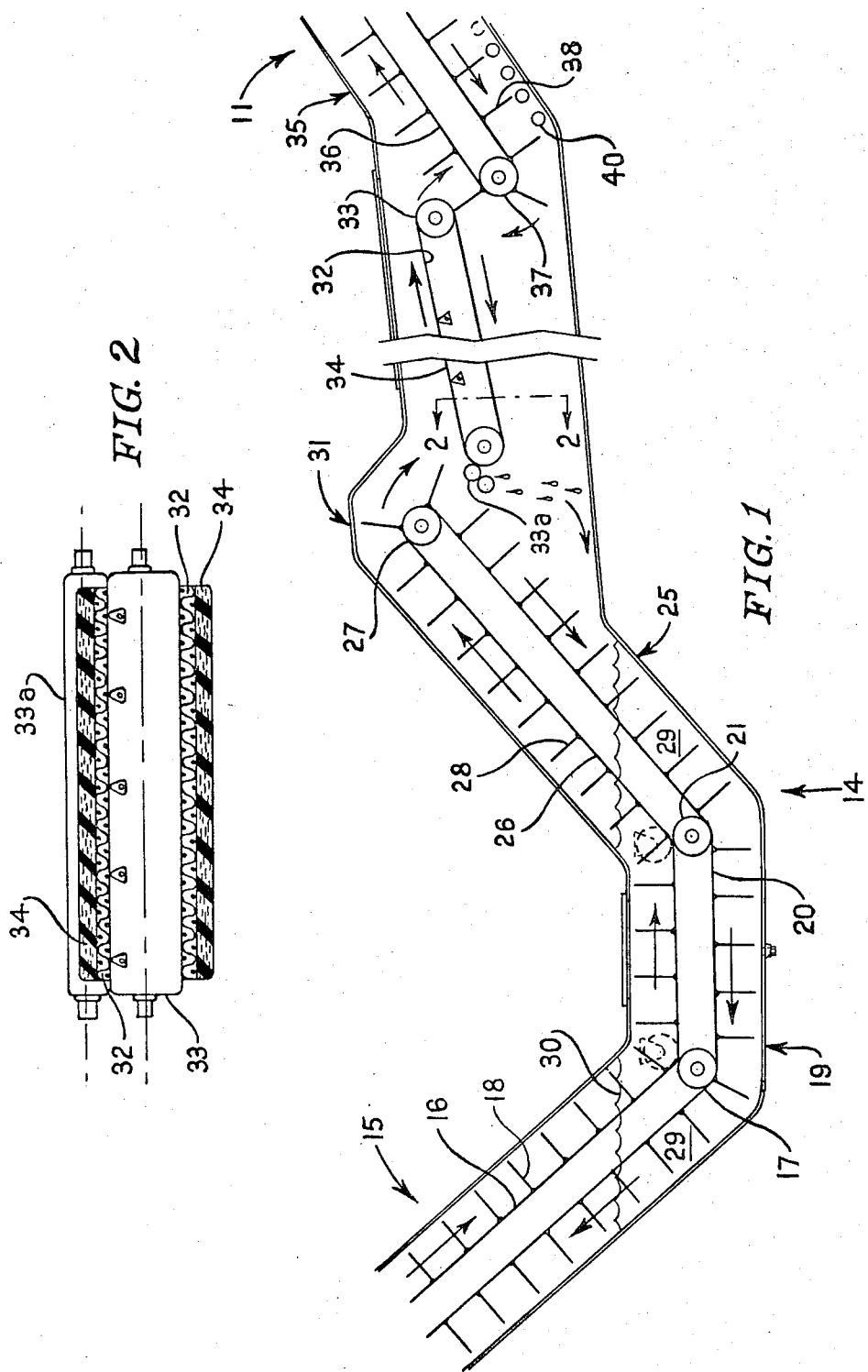

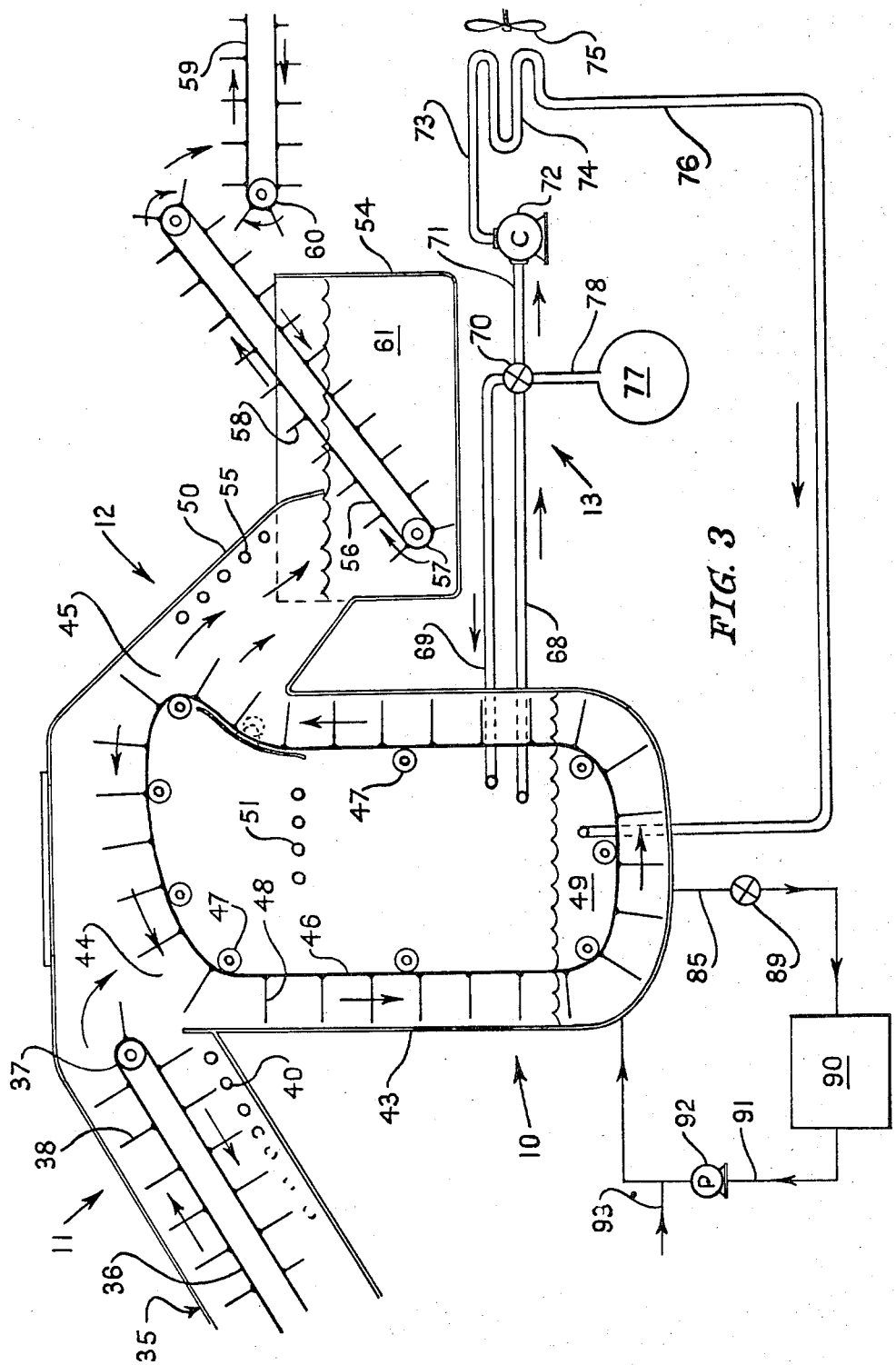

COOLING FOOD PRODUCTS

SPECIFICATION

This application is a continuation in-part of my copending application Ser. No. 188,857 filed Oct. 13, 1971 entitled "Liquid Treatment and Extraction Apparatus" now Pat. No. 3,793,937. This application is also a Continuation-in-Part of my copending application Ser. No. 190,373 filed Oct. 18, 1971 entitled "Method of Treating Solid Substances with Fluorocarbons."

This invention relates to the processing of food products with the use of water-immiscible liquids, more particularly those which have a freezing point substantially below that of water and particularly the low boiling fluorocarbons. More particularly this invention relates to the cooling of the flesh of freshly killed animals, such as chickens and other poultry products, beef, pork, etc., and the cooling of freshly harvested vegetables such as green beans and peas.

In the processing of chickens, which will be described first as an example of the field of application of the invention, it is common practice, after the chickens have been killed, plucked and eviscerated, to cool the chickens (either whole or disjointed) by passing them through a water cooler or other cooling or refrigerating means. This requires a considerable period of time to bring the chickens to the desired temperature, which is about 32° to 38° F. This cooling process is accompanied by completion of rigor mortis and by tenderizing of the flesh. The reduced temperature prolongs storage life and reduces the danger of infection or growth of pathogenic organisms, especially Salmonella.

Among the disadvantages of this process are the considerable length of time required, loss of weight of the birds, buildup of bacterial count in the water used for cooling (which must therefore be changed frequently) and the need to store the cooled birds for a considerable period of time to allow drainage of water.

It is an object of the present invention to provide improvements in the processing of food products, especially the flesh of freshly killed animals, such as chicken, other poultry, beef, pork, etc.

It is further and particular object of the invention to provide a means whereby food products, particularly those described above, can be quickly brought to a suitable condition of temperature such that, upon subsequent equilibration, the entire body of the food product is cooled to the desired temperature.

The above and other objects of the invention will be apparent from the ensuing description and the appended claims.

In accordance with the present invention, a liquid fluorocarbon or other liquid having a freezing point substantially below that of water, for example, liquid nitrogen, is employed to cool the food product.

Typical fluorocarbons which may be used in accordance with the invention are the following:

| Solvent | Formula | Boiling point °F | °C |
|---|---|---|---|
| Tetrafluoromethane | $CF_4$ | −198.4 | −128.0 |
| Trifluoromethane | $CHF_3$ | −115.7 | −82.1 |
| Trifluoromonochloromethane | $CClF_3$ | −114.6 | −81.4 |
| Hexafluoroethane | $CF_3$—$CF_3$ | −108.8 | −78.2 |
| Trifluoromonobromomethane | $CBrF_3$ | −72.0 | −57.8 |
| Difluoromonochloromethane | $CHClF_2$ | −41.4 | −40.8 |
| Pentafluoromonochloroethane | $CClF_2$—$CF_3$ | −37.7 | −38.7 |
| Difluorodichloromethane | $CCl_2F_2$ | −21.6 | −29.8 |
| 1,1-difluoroethane | $CH_3$—$CHF_2$ | −11.2 | −24.0 |
| Symmetrical tetrafluorodichloroethane | $CClF_2$—$CClF_2$ | 38.4 | 3.6 |
| Monofluorodichloromethane | $CHCl_2F$ | 48.1 | 8.9 |
| Monofluorotrichloromethane | $CClF_3$ | 74.8 | 23.8 |
| Octafluorocyclobutane | cyclo-$(CF_2)_4$ | 21.1 | −6.0 |

Those fluorocarbons which boil substantially below the freezing point of water are preferred. Liquid nitrogen may also be used but low boiling fluorocarbons are preferred. Particularly preferred in this procedure is the use of difluorodichloromethane (hereinafter referred to as DFDCM) because this material, among other things, can be used at about its boiling point (−21.6° F) which is a conveniently maintained temperature. Also, this material is acceptable for contact with food products.

Since the refrigerant used for this purpose is volatile and its economical use requires recovery of the refrigerant vapor, a liquid sealing system is preferably employed such as that described in my copending application, Ser. No. 188,857 now Pat. No. 3,793,937, filed Oct. 13, 1971.

In the accompanying drawings, there is shown apparatus which is suitable for purposes of the present invention.

Referring to these drawings;

FIG. 1 is a view in longitudinal vertical section of the entry portion of apparatus suitable for purposes of the present invention and which embodies a liquid seal.

FIG. 2 is a view taken along the line 2—2 of FIG. 1 showing, on a larger scale than that of FIG. 1, the details of construction of a portion of the conveyer apparatus.

FIG. 3 is a continuation of FIG. 1 and shows the cooling element of the apparatus, the exit portion of the apparatus and the vapor pressure control portion of the apparatus.

Referring now to FIGS. 1 and 3 of the drawings, the apparatus comprises a cooling portion 10, a product entry portion 11, a product exit portion 12 and a vapor control portion and system 13.

The product entry portion 11 comprises a conduit or tunnel 14 having a downwardly sloping incoming portion 15 within which an endless conveyor 16 is carried on rollers, one of which is shown at 17, such conveyer being provided with barrier members 18. The space between each successive pair of barriers 18 is filled with increments of the food product to be cooled, e.g., whole chicken carcasses, pieces of chicken, pork, beef, green beans, peas, etc. The lowermost portion of the tunnel 14 comprises a horizontal section 19 within which a continuous conveyor belt 20 is located, which is supported on rollers 21. The horizontal portion 19 of the tunnel 14 leads to an upwardly slanting portion 25 within which is located a continuous conveyor belt 26 mounted on rollers such as shown at 27, and equipped with barrier members 28. A body of liquid such as water is maintained at 29 in the horizontal portion 19 of the tunnel 14 and thereabove to the level 30. A further segment of the tunnel 14 is shown at 31 which slopes slightly upwardly and within which there is an endless conveyor 32 mounted on rollers 33. This and other conveyors in the apparatus are preferably made of open mesh stainless steel. To the belt 32 is affixed a spongy layer 34, e.g., of sponge rubber. At its entry and the belt 32 and spongy layer 34 pass between squeeze rollers 33a. The section 31 of the tunnel 14 connects with an upwardly sloping section 35 within which is an endless conveyor 36 supported on rollers 37 and provided with barrier members 38. As shown, the conveyor segments 16, 20 and 26 may be a single continuous conveyor with pressure rollers at the points of inflection.

In operation, this entry portion 14 of the apparatus functions as follows: Food product in suitable increments is delivered by suitable means (not shown) and in measured amounts to each of the pockets formed by the belt 16 and barrier members 18. At the point 30 the food product enters the body of liquid 29 and remains in that body of liquid until it emerges in section 25. Preferably this body of liquid is water and it may be ordinary tap water. If it should be desired to pre-cool the food product, this water may be refrigerated somewhat. An advantage of cooling the water at 29 to about 32°F (or lower if it contains a solute that lowers its freezing point [see below]) is that the amount of water vapor is reduced and contamination of refrigerant vapor in cooling portion 10 is minimized. The food product will then proceed upwardly along the conveyor 26 and will be dumped onto conveyor 32. The conveyor 26 is vibrated by suitable means (not shown) to shake off adhering water which falls back into the body of water 29. The temperature in this segment of the tunnel 14 is preferably maintained above the freezing point of water, such that no ice forms therein. The conveyor belt 32-34 will be vibrated by suitable means (now shown) so that all surfaces of the food product will come into contact with the sponge belt and adhering moisture will be shaken off and will be absorbed by the sponge belt, so that the food product as delivered to the segment 35 of the tunnel 14 will be as free as possible of water. Water absorbed by the sponge belt is squeezed out by the squeeze rollers 33a and will flow back into the body of water 29.

It is desirable to keep as much water as possible both in vapor or liquid form, out of the contact portion 10. To this end the segment 35 of the tunnel 14 is sloped upwardly so that water will fall back. Moreover, coils are shown at 40 which refrigerate the segment 35 to the point that water vapor is condensed and flow of water vapor into the contact portion 10 is minimized. The temperature in segment 35, however, is kept above the boiling point of the fluorocarbon in tank 43 (see below) so that none of it condenses in segment 35 and therfore none of it reaches the body of water 29. Preferably the temperature in segment 35 is low enough to freeze the water, and ice is removed from time to time by defrosting.

The contact portion 10 is shown as an insulated tank 43 which is closed except for food product inlet 44 and a food product outlet 45, and except for vapor and liquid inlets and outlets described hereinafter. Within this tank there is a continuous conveyor belt 46 supported on rollers 47 and provided with barrier members 48. As will be seen, this conveyor describes a loop. Commencing at the food product inlet point 44, the conveyor proceeds vertically downwardly, at its lowest point it is submerged in liquid refrigerant such as DFDCM (difluorodichloromethane) at 49, and it thence proceeds upwardly, thence around a bend adapted to dump the food product into an outlet duct 50. Thence the conveyor proceeds upwardly, around and back to the food product entry point 44. Within the vapor space above the level of the liquid refrigerant are coils, one of which is shown at 51, such coils being distributed about the vapor space at suitable points and in suitable number and carrying a refrigerant such as liquid ammonia, which is capable of lowering the temperature of the vapor below its boiling point, thereby condensing it. A suitable temperature in the vapor space is −22° to −58° F if the refrigerant is DFDCM. The dwell time of the food product in the pool of DFDCM is such that they are at least surface frozen.

Referring now to the exit portion 12 of the apparatus, a tank 54 is provided into which the outlet duct 50 extends. Refrigeration coils 55 are provided for the duct 50 to condense water vapor therein. As in the case of the segment 35, the temperature is above the boiling point of the fluorocarbon. Within the tank 54 is an endless conveyor 56 supported on rollers 57, such conveyor having barrier members of cleats 58 whereby the food product is conveyed to the upper end of the conveyor 55 and dumped onto a conveyor 59 supported on rollers, one of which is shown at 60. The food product is then subjected to any desired further processing, e.g., to holding at a low temperature until the entire body of food product is at the same temperature, or as in the processing of tomatoes as described below the cooled or refrigerated food product may be submerged in warm water, e.g., to facilitate removal of skins, or it may go to cold storage. A body of liquid, preferably water 61 is maintained in the tank 54. Preferably this water is maintained close to 32°F or below 32°F with the aid of a solute to minimize its vaporization. Water condensed in duct 50 drains back into the tank 54.

Referring now to the vapor pressure control system, a vapor outlet pipe is shown at 68 and a vapor inlet pipe at 69, both of which are open to the interior of the tank 43. The pipes 68 and 69 are connected to different ports of an automatic pressure-operated three-way valve 70 of known type and caonstruction. If the vapor pressure within the tank 43 above the liquid level becomes excessive, the valve 70 is automatically turned to a position such as to connect the vapor outlet pipe 68 with a pipe 71 leading to a compressor 72 which compresses the vapor and passes it through an outlet 73 to a condensing coil 74. A fan shown at 75 indicates a cooling means which extracts heat from the compressed vapor and causes condensation of the vapor to the liquid state. The condensate passes through a pipe 76 and back into the tank 43 and the pool of liquid refrigerant. On the other hand, if the vapor pressure within the tank 43 becomes too low, the valve 70 is automatically adjusted to a position such that the vapor inlet pipe 69 is connected to a source 77 of vapor under pressure through a pipe 78. This system operates automatically to maintain the vapor pressure within the tank 43 at the desired level. Preferably, since the water seals and inlet and outlet tunnels and ducts are normally at atmospheric pressure, the valve 70 is set to maintain a vapor pressure within tank 43 which is approximately one atmosphere.

Inasmuch as the body of fluorocarbon 49 will become contaminated, for example by extraction of material from the food product, from time to time or continuously some of the fluorocarbon is drawn off through a line 85 containing a valve 86 and is purified in an apparatus 90 which may be a filter and/or a solvent extraction unit and/or a distillation unit. The purified fluorocarbon is returned through a line 91 by a pump 92. Make-up fluorocarbon is introduced through a line 93. The amount of such make-up is, however, very small.

It may be that the used fluorocarbon which is treated at 90 to purify it contains an extract which is of value. For example, as described in my copending application Ser. No. 188,857 now patent no. 3,793,937 filed Oct. 13, 1971, the fluorocarbon may be used to reduce the fatty oil content of potato slices cooked in oil be extracting some of the oil. In such case the fluorocarbon withdrawn from tank 43 and purified by distillation at 90 leaves a residue of extracted fatty oil which will be recirculated to the cooking step to cook a further quantity of potato slices.

If it is desired to limit or avoid the extraction of oil from a food product, e.g. French fried potatoes or potato chips, the body of fluorocarbon may be kept with a predetermined amount (e.g., to saturation) of the same oil to limit or prevent extraction of fatty oil from the food product.

The apparatus shown in FIGS. 1 to 3 minimizes the entry of wator vapor and air into the tank 43 and contamination of the fluorocarbon. From time to time it will be necessary, however, to admit air to the tank 43 as during shut down and servicing, defrosting, repairs, etc. Therefore, upon starting up the apparatus it is desirable to eliminate air and water vapor that has entered the system between the liquid seals 29 and 61. This may be done by pulling a vacuum on the tank 43 while it is empty, then purging the tank with fluorocarbon vapor and then admitting fluorocarbon liquid, suitable valves and a vacuum pump (not shown) being used for the purpose. The entry of water vapor into the tank 43 can be minimized during these pumping and purging operations by keeping the liquid seals at a low temperature, e.g. at or below 32°F, by refrigeration coils (not shown) and by using the refrigeration coils 40 and 55 to condense vapor and even to freeze water in the entry and exit portions of the apparatus.

Water has been mentioned specifically as the liquid for the seals 29 and 61. However, other liquids which boil substantially higher than the fluorocarbon 49 and which are compatible with the food product may be used in either or both of the seals 29 and 61. For example either or both seals may be a fatty oil such as corn oil, peanut oil, soy oil, coconut oil, olive oil and blends thereof. The entry oil seal 29 may be heated and therefore serve the double purpose of cooking a food product, e.g. potato slices or potato chips, as well as acting as a seal.

The process of the invention is applicable to the cooling or refrigeration of many food products, such as beef, pork, turkey, etc., also to the cooling or refrigeration of vegetables, such as green beans, green peas, lettuce, etc. The degree of cooling, for example, whether bringing to room temperature, to a refrigerated temperature of about 30° to 40°F, to surface freezing or to freezing of the entire product, can be controlled by the residence time in the refrigerant medium.

Agents effective to produce other than cooling and refrigeration may be included, such as antibacterial, germicidal and sterilizing agents, antioxidants and flavoring media. Examples of such agents are as follows:

Anti-microbial, etc., agents (Bactericidal, bacteriostatic, antibiotic, etc.)

sodium nitrite
sodium nitrate
sodium benzoate
benzoic acid
nisin
subtilin
trypsin
ammonia
hydrogen peroxide
streptomycin
penicillin
chlor-terramycin
tetracycline
chlorotetracycline
oxytetracycline
boric acid
vanillic acid esters
hexamethylene tetramine
sorbic acid
cinnamic acid derivatives
polymixin
ethylene oxide
propylene oxide

Pesticidan agents (Insecticides, fungicides, fumigants, etc.)

DDT
chlordane
benzene hexachloride
other chlorinated hydrocarbons
dieldrin
hexaethyl tetraphosphates (HETP)
parathion
lauryl thiocyaniote
nicotine
pyrethium
rotenone
lead, calcium and copper arsenates
methyl bromide
ethylene oxide
carbondisulfide
carbon tetrachloride

Antioxidants butylated hydroxy anisole
butylated hydroxy toluene
citric acid
octyl gallate
propyl gallate
dodecyl gallate
o-phenyl phenol
sodium salt of o-phenyl phenol
sorbic acid
o-tocopherol

Flavoring Agents oil of anise
oil of pepper
oil of nutmeg
oil of cloves
oil of caraway
vanilla Colorants amaranth (FD & C Red No. 2)
erythrosine (FD & C Red No. 3)
carmine
cochineal dye
rose liquid
violet No. 1 (FD & C Violet No. 1)

When the active agent is adequately soluble in the fluorocarbon, it is merely dissolved in it, otherwise a suitable anionic, cationic or non-ionic surfactant is employed, examples of which are as follows: lecithin, hydroxylated lecithins, refined phospholipids, polyoxyethylene sorbitan fatty acid esters, sorbitan esters of fatty acids, propylene glycol monolaurate and monostearate, glycerol monostearate and mono-oleate, safflower monoglycerides, polyoxyethylene nonyl phenol adducts, diethylene glycol monolaurate and monooleate; polyethylene glycol and mono- and di-laurates, stearates and oleates; polyoxyethylene ethers; coconut, lauric and stearic diethanolamides; phosphotidyl choline mono- and diglycerides, inosital phosphatides, cephalin fractions, sodium stearoyl-2-lactylate, di-octyl sodium sulfosuccinate, di-acetyl sodium sulfosuccinate; salts of quarternary nitrogen bases.

The proportion of active agent and fluorocarbon may vary widely; for example, from the minimum proportion of active agent (the balance being fluorocarbon) necessary to be effective for the intended purpose, to an amount above which an increased quantity of active agent provides no substantial additional benefit. With very strong active agents requiring only very small or trace amounts to be effective such, for example, as the juvenile hormone and related compounds having similar hormonal activity, a very small fraction of 1 per cent, for example, 0.01 to 0.1 per cent may be appropriate. In the case of more mildly active agents higher concentrations may be used. For example, 1 per cent or more may be used. Typical upper limits would be 5, 10 or 20 per cent, depending upon intended use, and relative cost of active agent and fluorocarbon. As much as 50 per cent or more of active agent may be used in a concentrate to be diluted with more of the fluorocarbon for end use. (Percentages throughout are by weight, based upon total composition, unless otherwise stated.)

The surfactant, if one is used, will be used in an amount sufficient to emulsify the active agent in the fluorocarbon.

The preferred active agent for sterilization and antibacterial purposes is ethylene oxide. This material is a known and highly effective bactericidal and sterilizing agent which is sanctioned for use in connection with food products, surgical instruments, and the like, because it is volatile (boiling point about 13°C) and therefore can be readily dissipated after it has performed its intended function and will leave no toxic residue. Ethylene oxide has been employed in gaseous form, for example, to fill containers of nuts, grain or dried fruit to kill insects and micro-organisms that contaminate such food products. It has also been used in the form of an aerosol spray with carbon dioxide or difluorodichloromethane (hereinafter referred to as "DFDCM") as the propellant. Note that the preferred fluorocarbon in the present invention has been employed heretofore with ethylene oxide, but only as a gaseous propellant, and not in the form of a solution of the ethylene oxide in the liquid fluorocarbon.

Continuing with the description of the utilization of ethylene oxide in the practice of the present invention, it is miscible in all proportions with most if not all of the fluorocarbons of the present invention, including DFDCM. The latter (DFDCM) is the preferred fluorocarbon in the practice of the present invention, both with ethylene oxide and with other active agents. DFDCM is commercially available in quantity; it is acceptable for the processing of food products and with articles to be brought into contact with food products; it is readily dissipated by vaporization; it is readily recaptured for recycling for the same use or for some other use; it has good solvent properties for ethylene oxide and other active agents; it is non-inflammable, etc. Suitable solutions of ethylene oxide in DFDCM are, for example, those containing as little as 0.001 per cent to as much as 15 per cent of ethylene oxide, the balance being DFDCM. The intended use will determine the amount to be used.

The following specific examples will serve further to illustrate the practice and advantages of the invention.

EXAMPLE 1: COOLING OF CHICKEN

Whole chickens, after plucking and evisceration, and with a body temperature typically of about 80°F, are introduced into the apparatus of FIGS. 1, 2 and 3. The water seal at 29 may be maintained at ambient temperature or lower, for example, about 32°F, by means of refrigeration coils (not shown). The speed of passage through the apparatus may be such that the residence time in the body of refrigerant 49 is about 15 seconds, more or less, which is sufficient to freeze the outer layers of the chicken and to produce an over-all temperature of 33° to 38°F when the chickens are equilibrated with respect to temperature. The water seal 61 is preferably maintained at about the freezing point of water or less, by having dissolved in it a solute which reduces its freezing point, for example, ethylene glycol, salt, sucrose, etc. Salt and sugar may serve the added function of flavoring the food produced. The water seal 29 and/or the body of refrigerant 49 and/or the water seal 61 may have dissolved in it an antibacterial agent and/or an antioxidant and/or a flavoring agent, such as any of those described above. The water in water seals 29 and 61 may be circulated through filters (not shown) which are of known type and which serve to remove bacteria and other micro-organisms as well as gross impurities and dissolved impurities. Instead of whole chickens, pieces of chickens, such as legs, wings, breasts, etc., may be processed in this manner, in which case, because of the smaller size of the parts, the residence time does not have to be as long.

Chickens so treated suffer substantially less loss of weight than chickens refrigerated by conventional means.

EXAMPLE 2: HAMBURGER PATTIES

Hamburger patties one-fourth inch thick are passed through the apparatus of FIGS. 1, 2 and 3, the residence time being about five seconds and the resulting equilibrated temperature being about 30°F. By dipping the patties for 2 seconds, a temperature of about 36°F is reached. Patties three-eighths inch in thickness dipped for 5 seconds had a temperature of about 36°F and when dipped for 10 seconds had a temperature of about 40°F.

Patties so treated lost less than 1 per cent in weight compared to a loss of 2 to 5 per cent when refrigerated to about the same temperature by cold air or a refrigerated room. Also the patties do not dry out and are more palatable.

EXAMPLE 3: COOLING OF FRESH VEGETABLES

Freshly picked green beans and peas are in some instances cooled at the growing site by a hydrocooler which employs water and in some instances ice to cool the freshly harvested product. The cooled product is then transported, packed in ice, to a processing plant such as a cannery. In accordance with the present invention, the freshly picked beans or peas are passed through the apparatus of FIGS. 1, 2 and 3. The water seal 29 may serve only to wash the vegetables and in such case the water will be withdrawn and replaced by fresh water, either continuously or intermittently. The vegetables may be surface frozen or wholly frozen as desired. In either case the ice formed in situ by freezing serves to keep the vegetables cool during transport, assisted if need be by added ice.

EXAMPLE 4: FREEZE TREATMENT OF TOMATOES

A known process of treating tomatoes, peaches, apricots, etc. (whole fruits and vegetables having a soft, relatively loose skin) comprises freezing the skins and contiguous layer of flesh, then thawing and warming by means of warm water or in an oven. As a result, the flesh near the skin is ruptured and is easily removed together with the skin by gentle abrasion activity, eg.g. by the action of counter rotating, rubber covered rollers. This process may be carried out in accordance with the present invention. Since the second water seal 61 is preferably kept refrigerated to reduce the entry of water vapor into tank 43, the tomatoes are then passed through a second tank containing warm water or through an oven.

In another embodiment, the tomatoes may be completely frozen by appropriately lengthening their residence time in the refrigerant liquid 49. The frozen tomatoes are then thawed in warm water or in an oven. The skins are punctured or the tomatoes are macerated. The skins and seeds are separated and employed as a component of animal feed. Clear liquid is separated and employed as or converted into juice for beverage purposes. Paste is separated and converted into tomato paste, ketchup, tomato juice concentrate, etc.

EXAMPLE 5: TREATMENT OF RIPE OLIVES

Ripe olives are produced by a process including a treatment with brine and with caustic solution. A uniform black color is imparted by treatment with ferrous gluconate. This has the disadvantage that it produces an off-flavor. In accordance with the present invention, the olives, before treatment with brine and caustic solution, are dipped briefly, for example 1 to 3 seconds, in difluorodichloromethane and are then warmed. This produces a uniform black color and requires the use of little or no ferrous gluconate.

In any application of the invention where it is desired to freeze a product partially or entirely and to keep it in the frozen state, the outlet seal 61 may be kept at a low temperature, e.g., by the use of a freezing point depressant such as sodium chloride, etc. and the use of refrigeration coils, and/or the time of transit through the seal 61 may be short enough that thawing does not occur.

If it is desired to cool or freeze (surface and/or entirely) a packaged product, the food product in a suitable package such as nylon, polyethylene, etc. which is compatible with the temperature of the fluorocarbon 49 may be used to enclose and perhaps to protect it during its transit through the apparatus.

It will therefore be apparent that new and useful apparatus and method have been provided for the processing of food products.

I claim:

1. The method of inhibiting the growth of pathogenic organisms on, and of cooling the flesh of freshly killed, warm-blooded animals which still retains a substantial portion of its natural body heat, said method comprising immersing said flesh in a body of a liquid refrigerant having a boiling point substantially below the freezing point of water, and maintaining the flesh in said liquid for a residence time sufficient to freeze only the outer layers of the flesh; then withdrawing the resulting, surface-frozen flesh from the liquid refrigerant and allowing the flesh to equilibrate with respect to temperature as the processes of rigor mortis in the flesh are completed; said equilibration inducing an overall temperature in the flesh of from about 33° to 38° F.

2. The method of claim 1 wherein the surface-frozen flesh removed from the liquid refrigerant is passed through a liquid exit seal before being allowed to equilibrate to temperatures of from about 33° to 38° F.

3. The method of claim 1 wherein the liquid refrigerant is a fluorocarbon.

4. The method of claim 3 wherein the flesh is that of poultry.

5. The method of claim 1 wherein the liquid refrigerant is liquid nitrogen.

6. The method of claim 5 wherein the flesh is that of poultry.

* * * * *